US005408373A

United States Patent [19]
Bajorek et al.

[11] Patent Number: 5,408,373
[45] Date of Patent: Apr. 18, 1995

[54] INTEGRATED TRANSDUCER-SUSPENSION ASSEMBLY FOR VERTICAL RECORDING

[75] Inventors: Christopher H. Bajorek, Los Gatos; Robert E. Fontana, San Jose; Clint D. Snyder, Monte Sereno; David A. Thompson, San Jose; Mason L. Williams, San Jose; Celia E. Yeack-Scranton, San Jose, all of Calif.

[73] Assignee: International Business Machines Corporation, Armonk, N.Y.

[21] Appl. No.: 33,302

[22] Filed: Mar. 15, 1993

[51] Int. Cl.6 .................. G11B 5/105; G11B 5/127
[52] U.S. Cl. ............................... 360/104; 360/126
[58] Field of Search ............... 360/104, 103, 126, 122, 360/113

[56] References Cited

U.S. PATENT DOCUMENTS

| | | | |
|---|---|---|---|
| 3,975,772 | 8/1976 | Lin | 360/113 |
| 4,710,838 | 12/1987 | Jahnke | 360/122 |
| 4,933,791 | 6/1990 | Cheng | 360/104 |
| 5,041,932 | 8/1991 | Hamilton | 360/104 |
| 5,073,242 | 12/1991 | Hamilton | 204/192.22 |
| 5,111,351 | 5/1992 | Hamilton | 360/104 |
| 5,166,845 | 11/1992 | Thompson et al. | 360/104 |
| 5,272,582 | 12/1993 | Shibata et al. | 360/126 |

OTHER PUBLICATIONS

Kaus et al, *Sliders For Magnetic Heads Of Surface-Hardened Silicon With Integrated Electronic Components*, Dec. 1982, IBM Technical Disclosure Bulletin, vol. 25, No. 7A, p. 3173.

Primary Examiner—Robert S. Tupper
Assistant Examiner—William R. Korzuch
Attorney, Agent, or Firm—Leslie G. Murray

[57] ABSTRACT

An integral combination magnetic transducer and suspension assembly suitable for use in both contact recording and in winchester-type applications is described. A generally rectangular elongated flat suspension member includes a vertical-type inductive read/write transducer formed integrally with the suspension member and is embedded in one end of the suspension member. The vertical inductive transducer is suitable for vertical recording applications. The transducer vertical magnetic pole tip and magnetic yoke structure are formed at one end of the suspension member with the vertical pole tip extending to and exposed at a air bearing surface formed on the lower surface of a slider-shaped protrusion extending from the lower surface of the end of the suspension member. The integral transducer/suspension assembly can be adapted for either flying above the recording media or for use in continuous contact with the recording media. The air bearing surface is formed on the lower surface of a wear pad. The fabrication of the transducer/suspension assembly is adapted to be performed at the wafer level.

8 Claims, 9 Drawing Sheets

INTEGRATED TRANSDUCER-SUSPENSION ASSEMBLY FOR VERTICAL RECORDING

CROSS-REFERENCE TO RELATED APPLICATIONS

"Integrated Transducer/Slider/Suspension Assembly", Ser. No. 08/202,862, filed Feb. 25, 1994 (Continuation of Ser. No. 07/876,533, filed Apr. 30, 1992, now abandoned);

"Integrated Transducer-Suspension Structure for Longitudinal Recording", Ser. No. 08/252,147, filed Jun. 1, 1994 (Continuation of Ser. No. 07/932,826, filed Aug. 19, 1992);

"Magnetic Head for Recording with Ultra Low Force", Ser. No. 08/259,370, filed Jun. 14, 1994 (Continuation of Ser. No. 07/935,000, filed Aug. 25, 1992); and "Integral Transducer-Suspension Assemblies for Longitudinal Recording", Ser. No. 08/270,104, filed Jul. 1, 1994 (Continuation of Ser. No. 08/002,290, filed Jan. 8, 1993).

BACKGROUND OF THE INVENTION

The present invention relates generally to moving magnetic storage devices and to recording elements incorporated therein, and more particularly to integrated transducer/suspension structures for vertical recording and reproduction which are suitable for batch fabrication and a method for fabrication of the structures.

Moving magnetic storage devices, especially magnetic disk drives, are the memory device of choice. This is due to their expanded non-volatile memory storage capability together with a relatively low cost. Accurate retrieval of the stored information from these devices becomes critical, requiring the magnetic transducer to be positioned as close to the storage media as possible. Optimally, the transducer may actually contact the media.

Magnetic disk drives are information storage devices which utilize at least one rotatable magnetic media disk having concentric data tracks defined for storing data, a read/write transducer for reading the data from or writing the data to the various data tracks, a support means, generally referred to as a slider, for supporting the transducer adjacent the data tracks typically in a flying mode above the storage media, a suspension assembly for resiliently supporting the slider and the transducer over the data tracks, and a positioning actuator coupled to the transducer/slider/suspension combination for moving the transducer across the media to the desired data track and maintaining the transducer over the data track center line during a read or a write operation. The transducer is attached to or is formed integrally with the slider which supports the transducer above the data surface of the storage disk by a cushion of air, referred to as an air bearing, generated by the rotating disk. Alternatively, the transducer may operate in contact with the surface of the disk. The suspension provides desired slider loading and dimensional stability between the slider and an actuator arm which couples the transducer/slider/suspension assembly to the actuator. The suspension is required to maintain the transducer and the slider adjacent the data surface of the disk with as low a loading force as possible. The actuator positions the transducer over the correct track according to the data desired on a read operation or to the correct track for placement of the data during a write operation. The actuator is controlled to position the transducer over the desired data track by shifting the combination assembly across the surface of the disk in a direction generally transverse to the data tracks.

In conventional disk drives, the transducer and the slider are formed separately and then attached to the suspension in a manual, operator controlled precision operation. Typically, these components are extremely small and the positioning of each relative to the other is critical and must be exact. During operation of the disk drive, the transducer must be exactly positioned relative to the data track, which in turn means that the suspension must be exactly positioned onto the slider. The suspension must also provide flexibility to pitch and roll motion for the slider relative to the direction of motion of the rotating disk and yet at the same time provide resistance to yaw motion. Electrical conductor leads connected to the transducer signal input/output terminals are directed along the suspension and connected to an amplifier placed on the suspension or on the actuator. The conductor leads must not add to the spring stiffness of the slider while providing good electrical interconnection. The conductor leads are generally bonded by soldering or ultrasonic bonding, for example, to both the transducer output terminals and the amplifier manually by an operator.

While magnetic recording of information is enormously successful, there is an ever increasing need to improve recording density. In the present state of the art the popular method of magnetic recording has been longitudinal recording. More recently, magnetic recording techniques have turned to considering vertical recording as compared to longitudinal recording as a means for improving the linear density of recorded information. In vertical recording, the magnetic polarity of the recorded bits is oriented vertically or perpendicularly with respect to the recording media surface. The magnetic flux from a recording head write pole-tip passes vertically through the magnetic storage medium, then downstream (or upstream) within the storage disk and back through the magnetic medium to a return pole which forms the flux return path for the magnetic head. The flux return pole has a pole face many times larger than the write pole tip so that the flux passing into the flux return pole is disbursed therealong and hence the flux density is low. Because the density of the flux passing through the recording medium at the return pole is low, there is very little effect by way of reversing or weakening any magnetic patterns in the recording medium downstream of the write pole tip.

As discussed above, the transducer, mounted on a slider, is supported above the relatively moving recording media surface by an air bearing. The performance of magnetic recording systems improve dramatically as the separation between the read/write transducer and the recording medium decreases. Additionally, decreasing the separation between the read/write transducer and the recording medium provides improved track density, the number of data tracks that can be defined on the media surface, as well as the recorded data linear density in an individual data track. However, as the flying height is reduced, the risk of head wear, and in particular, the potential for the transducer to inadvertently contact the disk surface incurring catastrophic wear increases greatly. In recording systems designed to operate with the read/write transducer/slider in contact with the media, the wear may be minimized by the proper selection of both slider and medium surface materials relating to hardness, coefficient of friction, thermal conductivity, etc. The wear between two surfaces in rubbing or sliding contact is also a significant function of the area of contact between the two surfaces and the applied load and inertial forces. While the actual area of contact is significantly less than the area of the surfaces involved, actual contact taking place only at microscopic asperities in the surfaces, reduction of the size and mass of the slider enables a significant red,-lotion in the local pressure greatly reducing wear between the surface of the slider and the medium.

To this end there have been disclosed variety of mechanisms which utilize an integrated "REED" approach to fabricating the transducer/slider/suspension assembly. Structured to work in a perpendicular or vertical magnetic recording environment, these devices permit the head and suspension to be easily manufactured having: (i) precise control of component elements utilizing thin film vacuum deposition techniques, (ii) precise formation of air bearings to achieve specified flying heights, (iii) bonding of sliders to suspensions, and, (iv) easy routing of conductor leads.

U.S. Pat. Nos. 5,041,932; 5,073,242; and 5,111,351 entitled "Integrated Magnetic Read/Write Head/Flexure/Conductor Structure" granted to Harold J. Hamilton disclose an integral magnetic transducer/suspension/conductive structure having the form of an elongate dielectric flexure or suspension body with a magnetic read/write transducer embedded within at one end thereof. In a preferred embodiment, Hamilton discloses an elongate, dielectric flexure body of aluminum oxide having a magnetic pole structure and helical coil integrally formed at one end of the flexure body with embedded copper conductor leads running the length of the flexure body to provide electrical connection for the transducer. The integral structure is fabricated utilizing conventional vapor deposition and photolithography techniques. The integral transducer/suspension structure disclosed by Hamilton may be used in a contact recording system or in a system where the transducer flies above the storage medium on a cushion of air.

Contact recording provides greater recording density and achieves higher read signals and greater resolution unregulated by variations in flying height. However, the war associated with prior art contact recording is generally not acceptable. While Hamilton, cited above, discloses an integrated transducer/suspension assembly with greatly reduced mass and size, the disclosed perpendicular head requires fabrication processing in two orthogonal planes which creates processing problems and greatly complicates the manufacturing process.

SUMMARY OF THE INVENTION

It is therefore a primary object of the present invention to provide an enhanced magnetic moving storage device having a integrated transducer/suspension structure that includes an enhanced read/write transducer configuration.

It is another object of the present invention to create a head-suspension structure which is suitable for vertical magnetic recording.

It is another object of the present invention to provide a vertical magnetic recording transducer suitable for use in a contact recording environment.

It is a further object of the present invention to provide an integrated transducer/suspension assembly including a vertical magnetic recording transducer which incorporates a magnetoresistive (MR) read sensor.

Still another object of the present invention is to provide an integrated transducer/suspension assembly which is suitable for batch processing in planes parallel to the surface of the initial wafer or substrate.

A REED transducer/suspension assembly according to the principles of the present invention provides an integrated, unitary suspension and magnetic transducer assembly for use with perpendicular or vertical recording media which can be adapted for contact recording as well as for flying above the recording media. Preferably a substrate is first patterned and etched to provide a cavity therein for formation of the REED assembly wear pad and the magnetic head vertical pole tip. A release layer is then deposited over the substrate and the individual thin film layers comprising the transducer and suspension sections are deposited. Horizontal coil conductors are inductively coupled to the transducer magnetic yoke structure and are connected to lead terminals formed at the end of the suspension section opposite the end at which the transducer is formed. The coil lead conductors and lead terminals are plated at the same time as the coil conductors and are encapsulated in the suspension section forming an integral element of the REED assembly. The transducer and suspension section layers are deposited on a process support substrate wafer in rows. The substrate is removed by dissolving the release layer to leave an integrated transducer/suspension assembly produced by batch fabrication.

In other preferred embodiments of the integrated REED assembly according to the present invention, the transducer section of the assembly comprises separate read and write heads, each head optimized for its particular function For example, the read head is constructed to have a narrow read magnetic pole tip while the write head has a relatively wide write magnetic pole tip. In the track width direction, the write wide, read narrow aspect of the invention minimizes the effect of spindle runout and intertrack interference. In one embodiment, the read head comprises a magnetoresistive sensor located remote to the ABS and disposed in a gap formed in a magnetic yoke structure having the read pole tip adapted to conduct magnetic flux to the MR sensor. The remote MR read sensor location makes track width independent of sensor length for narrow track sensor optimization. The remote location of the MR sensor away from the ABS eliminates design and operational problems associated with corrosion and wear, for example, present at the ABS.

Since the probe or pole tip of the vertical recording transducer is fabricated first, relatively high temperature annealing processes may be utilized prior to formation of the remaining transducer elements in subsequent process steps. This permits the use of temperature-critical materials and processes in subsequent fabrication steps without danger of adverse effects resulting from required annealing processes.

Additionally, the planar deposition arrangement in accordance with the present invention permits all processing of the transducer and suspension sections to be performed on a wafer surface. This allows batch production of the transducer and suspension sections as a unitary assembly.

Still another advantage of the present invention is the use of wear resistant material in the transducer structure and at the ABS. This protects the pole tip regions of the transducer and may be localized through patterning of the ABS to create a favorable air bearing loading condition for use in a flying environment.

BRIEF DESCRIPTION OF THE DRAWINGS

The foregoing, and other objects, features and advantages of the invention will be apparent from the following more particular description of preferred embodiments of the invention, as illustrated by the accompanying drawings, wherein.

DESCRIPTION OF THE PREFERRED EMBODIMENT

The preferred embodiments of the present invention are preferable for use in high density direct access storage devices such as found in large information storage systems as well as in the single disk files typically used in personal computers. The devices, e.g., disk drives or files, may use magnetic memory disks as the media.

Figure 1:
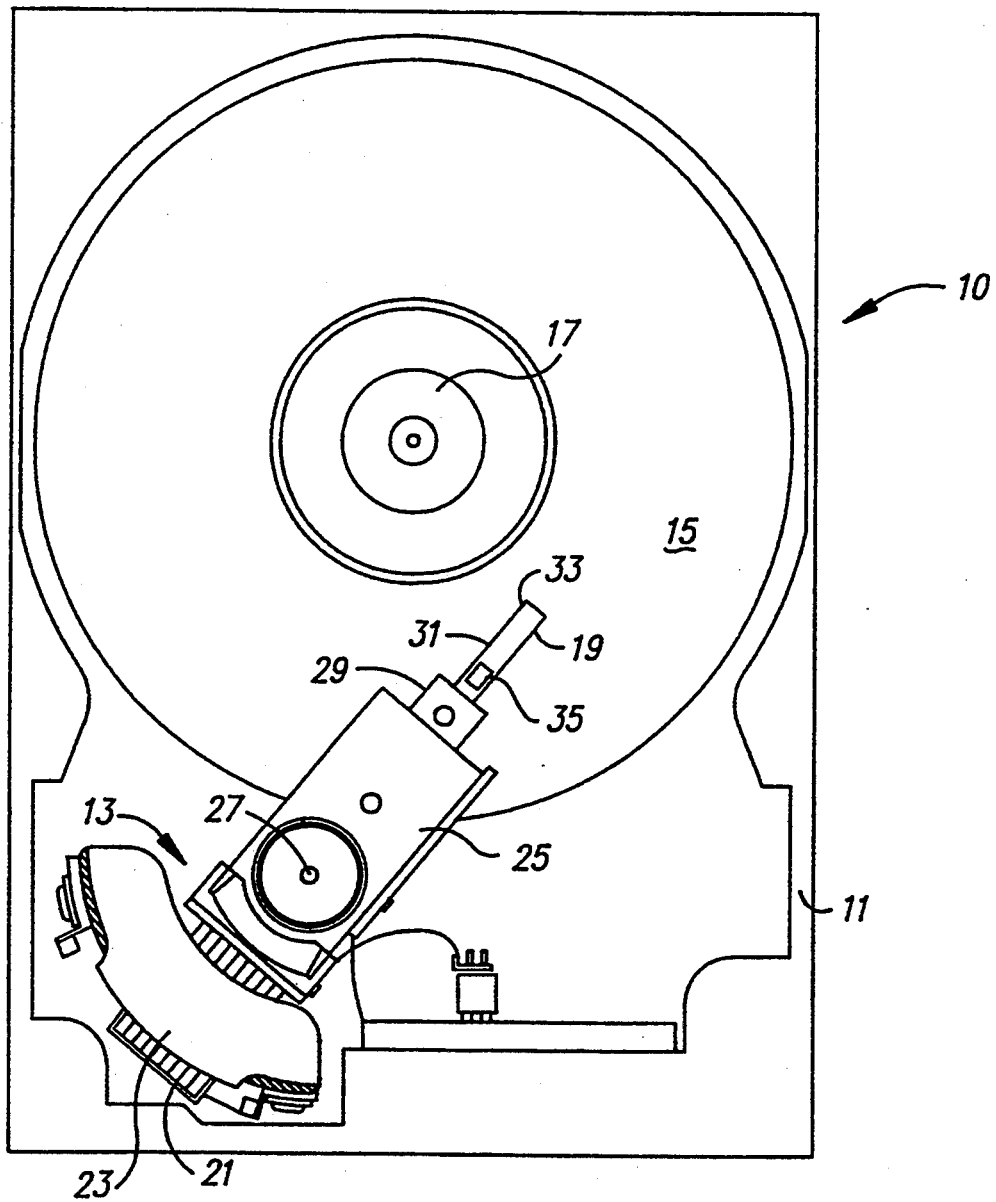
FIG. 1 is a top view illustrating a magnetic recording mechanism having a rotary actuator and incorporating the integrated REED transducer/suspension of the present invention.
Figure 2:
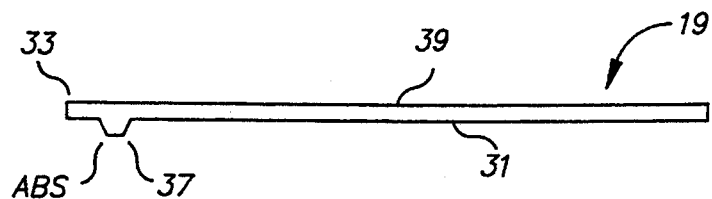
FIG. 2 is a cross-sectional view of an integrated REED transducer/suspension assembly in accordance with the present invention.

Referring now to FIGS. 1 and 2, a magnetic storage system 10 including a housing 11 in which is mounted rotary activator 13, one or more associated magnetic storage disks 15 mounted on a spindle 17 and a drive means (not shown) coupled to spindle 17 for rotating the disk 15 is shown. The rotary actuator 13 moves an integrated REED transducer/suspension assembly 19 in accordance with the present invention in an arcuate path across the surface of the storage disk 15. The rotary actuator 13 includes a voice coil motor comprising a coil 21 movable within the magnetic field of a fixed permanent magnet assembly 23. An actuator arm 25 having the moving coil 21 formed on one end thereof is pivotably mounted on pivot post 27. A support arm 29 is attached to the other end of the actuator arm 25 and projects across the surface of-the disk 15. The support arm 29 supports the integrated REED transducer/slider/suspension assembly 19 produced according to the procedure set forth herein in cantilever fashion over the surface of the disk 15. The REED assembly 19 includes a suspension section 31 and a transducer/slider 33 (as shown in FIG. 2) formed at one end integral with the suspension section 31. The suspension section 31 supports the transducer/slider 33 above the surface of the disk 15 on a bearing or cushion of air generated by the rotation of the disk 15. While for a particular application the specific dimensions are chosen for optimum performance, in general the REED assembly 19 will have an overall length in the range of about 5 to 20 millimeters (mm), a maximum width in the range of about 0.3 to 2.0 mm, a maximum thickness of about 20 to 50 micrometers ($\mu$m) in the suspension section 31 and about 30 to 65 $\mu$m in the transducer section 33 and a total mass in the range of about 200 micrograms to 1.5 milligrams. Alternatively, the suspension section 31 may support the transducer/slider 33 in contact with the disk media 15. The surface of the slider parallel to and adjacent the disk surface is referred to as the air bearing surface (ABS). It includes both configurations where the slider is designed to fly above the disk, sometimes referred to as a winchester-type drive, and where the slider is designed to contact the recording media, the disk 15, during operation. As described in more detail below, in a contact recording application, the slider may also be referred to as a wear or contact pad.

While only one disk 15 and one actuator arm 25 are shown, it is understood that the magnetic storage system 10 may comprise a number of magnetic storage disks 15 wherein the actuator arm 25 includes a plurality of support arms 29 with each arm 29 supporting at least one integral REED transducer/suspension assembly 19, each REED assembly 19 associated with a surface of one of the disks 15. Thus, disk 15 also has a REED assembly 19 mounted to an arm 29 of the actuator arm 25 on the underside of the disk 15. Further, other combination assemblies are associated with the top and bottom sides of other disks, the transducer access of which is controlled by the actuator 13.

The suspension section 31 of the REED transducer/suspension assembly 19 provides a load on the transducer/slider 33 which is substantially normal or perpendicular to the surface of the disk 15. This perpendicular load maintains the transducer/slider 33 in contact with the data surface of the disk 15 when the disk 15 is not being rotated. During operation of the disk drive 10 a aerodynamic lifting force is generated between the transducer/slider 33 ABS and the rotating disk 15 opposing the perpendicular load applied to the transducer/slider 33 causing the transducer/slider 33 to fly above the disk surface. Alternatively, in contact recording, during rotation of the disk 15, the transducer/slider 33 remains in contact with the media for reading or recording data.

During operation, the transducer/slider 33 is moved to the desired track of a plurality concentric data tracks defined on the data surface of the disk 15 by means of the actuator 13. The moveable coil 21 is controlled by positioning signals to move within the magnetic field of the magnet assembly 23 and thus pivot the actuator arm 25 about the pivot post 27. Because it is desired to provide rapid access of the transducer/slider 33 from one track to another track for read or write operations, it is necessary that the transducer be properly positioned over the desired track and reach that track in a minimum amount of time. It should be noted that while the actuator 13 illustrated in FIG. 1 is a rotatory actuator, other disk drive systems may utilize a linear actuator such as as known in the art. The REED assembly 19 must provide radial stiffness, and have substantial flexibility about the pitch and roll axes as it rides above the data surface of the disk 15. If desired, an integrated circuit amplifier assembly 35 may also be produced on the suspension section 31 of the integrated REED assembly 19.

Figure 3:
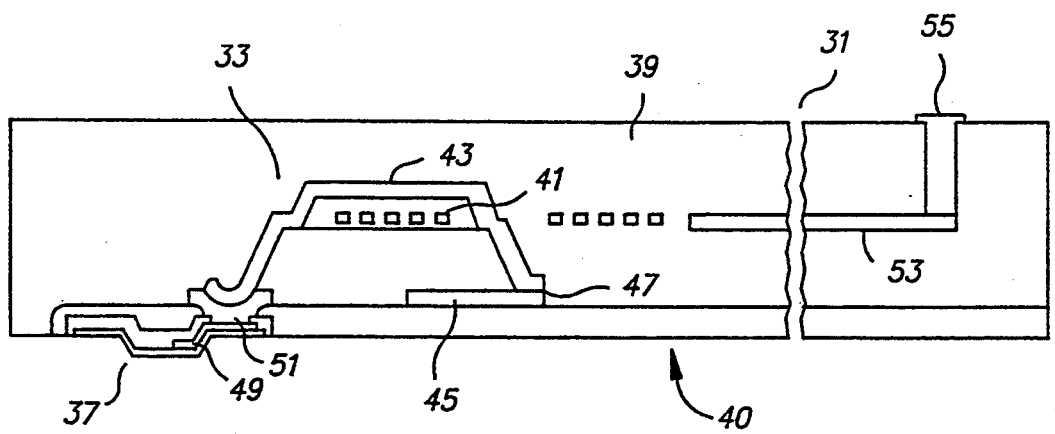
FIG. 3 is a cross-sectional view illustrating a preferred embodiment of an integrated REED transducer/suspension assembly in accordance with the present invention.
Figure 4:
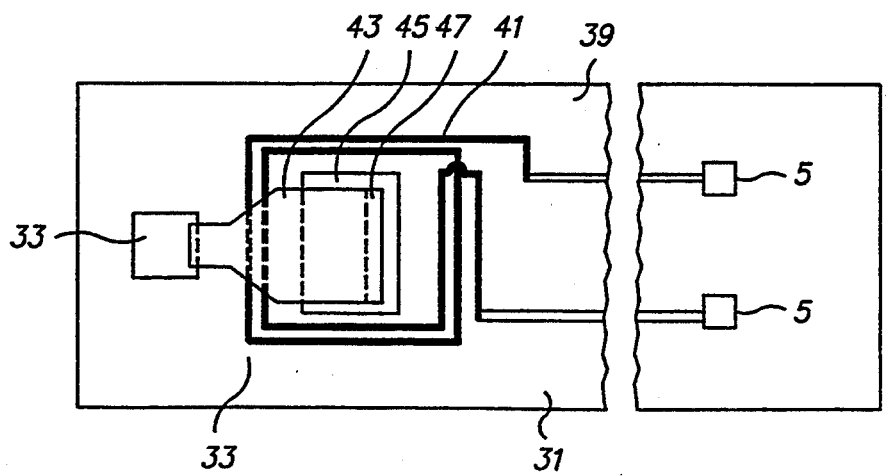
FIG. 4 is a top plan view of the REED assembly shown in FIG. 3.
Figure 5:
FIG. 5 is a cross-sectional view illustrating the probe tip and contact pad after wear-in for the REED assembly shown in FIGS. 3 and 4.
Figure 6:
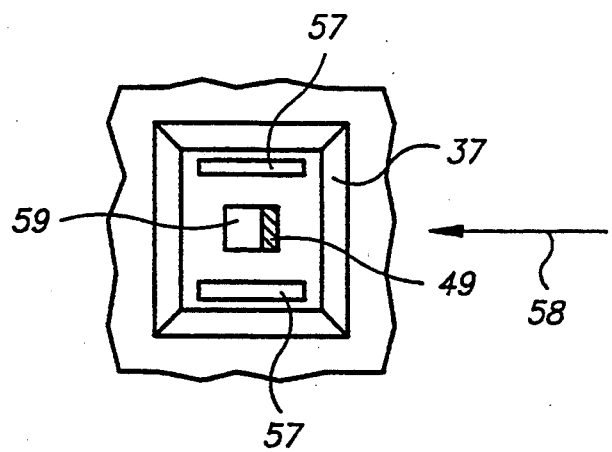
FIG. 6 is a view in perspective of the air bearing surface of the REED assembly shown in FIGS. 3 and 4 adapted for flying above the recording media.
Figure 7:
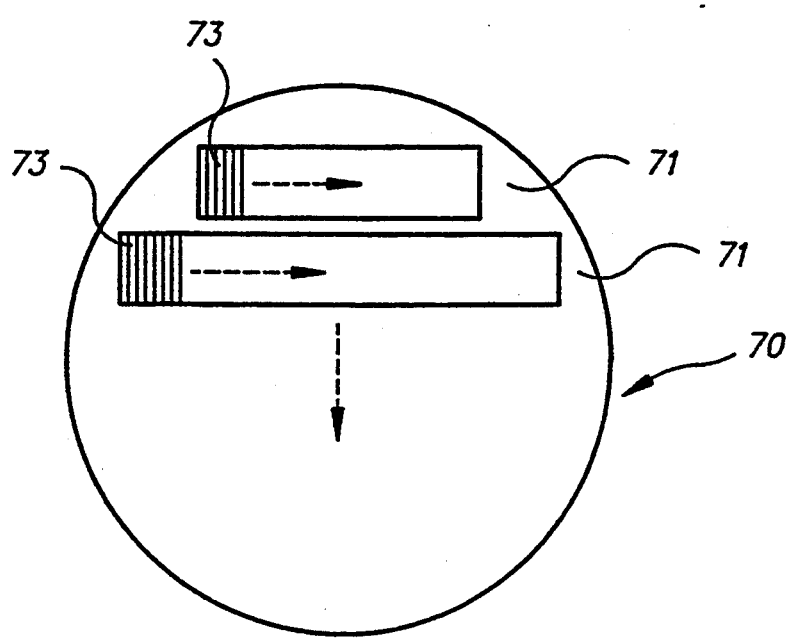
FIG. 7 is a top plan view of a wafer illustrating batch processing of the REED assembly shown in FIGS. 3 and 4 in accordance with the present invention.

Referring now also to FIGS. 3, 4 and 5, a preferred embodiment of the integrated REED transducer/suspension assembly 40 according to the principles of the present invention is illustrated. The integrated REED transducer/transducer structure 40 comprises an elongated generally rectangular body 39 of a dielectric material such as aluminum oxide ($Al_2O_3$) or silicon dioxide ($SiO_2$), for example, having a relatively uniform thickness along most of its length forming a suspension section 31 and a somewhat greater thickness at one end, the left hand end as shown, wherein a magnetic read/write transducer or head 33 is formed and a slider air bearing surface (ABS) is patterned on a lower side thereof. As mentioned above, the term ABS refers to the side of the slider which is generally parallel to and adjacent the media surface in both winchester-type disk files and contact recording applications. As shown in FIG. 2, the ABS comprises a shaped protrusion 37 formed on the lower side of the REED assembly body 39, preferably forming a wear or contact pad for contact recording applications. Alteratively, the shaped protrusion 37 can form a slider having an ABS patterned to generate a lifting force (as shown in FIG. 6) when relative motion exists between the REED assembly 19 and the media disk 15 to allow the slider to fly closely above the med surface. The shaped protrusion 37 and its surface are formed of a suitable material, such as diamond-like carbon, for example, to minimize wear and damage when the REED assembly contacts the media surface.

The read/write transducer 33 is formed integrally with the suspension section 31 to provide an integrated and unitary REED assembly 40. In the preferred embodiment, the transducer is a dual-purpose read/write head 33 and comprises a vertical probe-type magnetic inductive head for perpendicular recording applications, but can alternatively comprise a ring-type magnetic inductive head utilized in horizontal recording applications as described in co-pending U.S. patent application Ser. No. 08/002,290 filed on Jan. 8, 1993 and hereby incorporated by reference as if fully set forth herein. The read/write head 33 includes a magnetic circuit comprising an upper magnetic yoke or pole piece 43 magnetically coupled to a vertical probe or pole tip 49 at a front stud 51 and to a lower magnetic yoke or pole piece 45 at a back-gap 47. The vertical pole tip 49 is formed parallel to the protrusion 37 wall and intersects the ABS at an acute angle with respect to a vertical axis through the ABS. The pole tip 49 is generally rectangular shaped having a relatively small cross-sectional area to concentrate the magnetic flux and provide a high flux density write signal at the recording media 15. The width of the pole tip 49 at the ABS is traverse to the data tracks and is selected to define the desired data track width. The lower magnetic Dole 45 forms the return path for the head magnetic circuit. The lower magnetic pole 45 is shaped to have a relatively large surface and cross-sectional area and to provide a low flux density return path. Inductively coupled to the magnetic yoke structure is a horizontal spiral coil 41, with the ends of the coil connecting through lead conductors 53 extending the length of the suspension section 31 to terminal bonding pads 55. Bonding pads 55 provide terminals for coupling the transducer 33 to external circuitry, such as amplifier 35 (as shown in FIG. 1).

In a preferred embodiment, the integral REED assembly 40 comprises a body 39 of $Al_2O_3$ having a length of 12 mm, a width of 0.5 mm and a thickness of 35 $\mu$m for that portion of the body 39 forming suspension section 31 and maximum thickness of 50 $\mu$m for the read/write head section 33. The integral REED assembly 40 is fabricated utilizing well-known deposition and photolithography techniques on a base substrate or wafer, as described in greater detail below, utilizing a release layer to separate the find. shed REED assembly from the substrate. The upper and lower magnetic yokes 43 and 45 are of nickel-iron alloy (NiFe), generally referred to as permalloy, or other suitable magnetic material, such as iron (Fe), nickel (Ni) and cobalt (Co) or their alloys, and are preferably plated as is well-known in the art. Similarly, the coil windings 41, lead conductors 53 and terminal bonding pads 55 are also formed of copper (Cu) or gold (Au), for example, by plating techniques. Manufacturability of this embodiment is greatly simplified in that the vertical pole tip 9 is first fabricated and various annealing processes completed prior to the remaining portions of the REED assembly 40 being fabricated in layers parallel to the supporting substrate by conventional, well-known techniques. Once the REED assembly 40 has been formed and separated from the process supporting substrate, a portion of the wear-resistance material covering the lower portion of the protrusion 37 is removed by a wear-in or post-fabrication lapping process to expose the vertical pole tip 49 at the ABS as shown in FIG. 5.

Referring now also to FIG. 6, a plan view of the ABS of the REED assembly shown in FIG. 3 adapted to fly above the recording media 15 is shown. The ABS formed on the bottom surface of the protrusion 37 comprises a pair of rails formed along opposing sides of the protrusion 37 substantially parallel to the direction of the air flow as indicated by arrow 58 generated by the relative motion between the REED assembly and the disk 15. Wear pad 59 formed between the rails 57 provides support and protection from abrasive wear for the vertical pole tip 49 exposed at the surface thereof. Rails 57 and wear pad 59 are fabricated from a suitable wear resistant material such as diamond-like carbon, for example. As described with reference to FIG. 5, at the completion of the REED assembly fabrication process, the surface of the protrusion 37 is subjected to a lapping process which removes a portion of the wear resistant material planarizing the tops of the rails 57 and the wear pad 59 and exposing the pole tip 49.

Referring now to FIGS. 7 and 8a–8i, FIG. 7 is a plan view of the deposition surface of the process supporting substrate wafer 70. Individual REED assemblies 73 are batch fabricated in rows 71 on the surface of the wafer 71, the width of the row 70 being equal to the desired length of the completed REED assembly body 39. The entire fabrication process, with the exception of the post-fabrication lapping or wear-in process, comprises a series of process steps accomplished at the wafer level. FIGS. 8a–8i are cross-sectional views illustrating the processing steps involved in the fabrication of a preferred embodiment of the present invention incorporating the vertical read/write head 33 shown in FIG. 3.

Figure 8A:
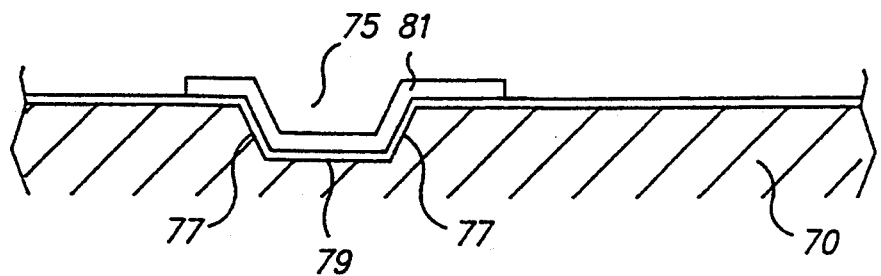
FIGS. 8a-8i are cross-sectional views illustrating the processing steps involved in the manufacture of the preferred embodiment of the present invention shown in FIGS. 3, 4, 5 and 6.
Figure 8B:
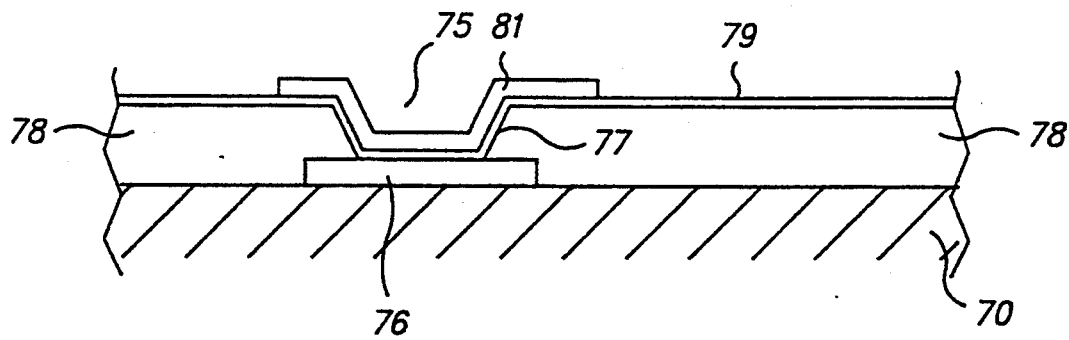

First, as seen in FIG. 8a, a layer of photoresist (not shown) is deposited over the entire surface of the substrate wafer 70 and patterned. Then, for each REED assembly 73 cavity 75 having slanted sidewalls 77 is formed or etched in the substrate 70, by laser, ion, chemical or mechanical etching, for example. The cavity 75 forms a template for the subsequent formation of the wear pad 37. A separation or release layer 79 is then deposited by sputter deposition, for example, over the substrate 70. The release layer 79 can be a single layer of a suitable material, such as Cu, for example, or may also include additional thin film layers (not shown) of titanium (Ti) or chromium (Cr) serving as adhesion layers. The release layer 79 allows the completed REED assembly 73 to separated from the substrate 70 at the conclusion of the batch processing. A first wear layer 81 of wear resistant material as deposited on the substrate 70 over the release layer 79 and patterned coating the bottom and slanted sidewalls 77 of cavity 75. Alternatively, as shown in FIG. 8b, cavity 75 may be formed by etching a layer of suitable material, such as alumina ($Al_2O_3$), for example, deposited over the surface of the substrate 70. First, a patterned etch stop 76 is formed on the substrate 70. The etch stop material is preferably a thin layer of Cr or tantalum (Ta) formed by sputter deposition or evaporation. Next, an alumina layer 78 is deposited onto substrate 70 to a thickness equal to the desired depth of the cavity 75. Following the deposition of the alumina layer 78, a via is etched into the alumina down to the etch stop layer 76 creating the cavity 75 and a template for the subsequent formation of the wear pad 37.

Figure 8C:
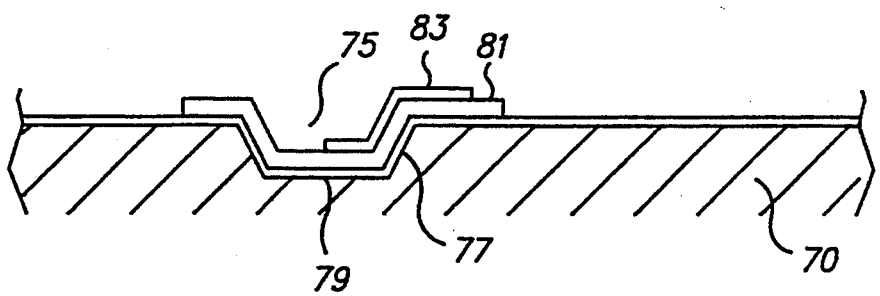
Figure 8D:
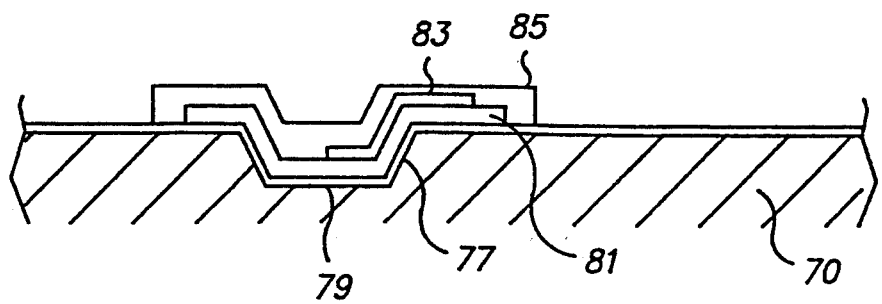

Next, as seen in FIGS. 8c and 8d, the vertical pole tip 83 is patterned and formed over a portion of the first wear layer 81 on the cavity sidewall 77. The vertical pole tip 83 is preferably of NiFe, or other suitable magnetic material, and may be sputter-deposited or electroplated as is known in the art. A second wear layer 85 is now patterned and formed over the first wear layer 81 and the vertical pole tip 83. Sufficient material is deposited to fill the cavity 75 which serves as the wear pad in the finished REED assembly. At this point in the fabrication process, or immediately after its formation, required annealing steps and other high temperature processes for optimizing the electrical and magnetic characteristics of the vertical pole tip 49 may be completed.

Figure 8F:
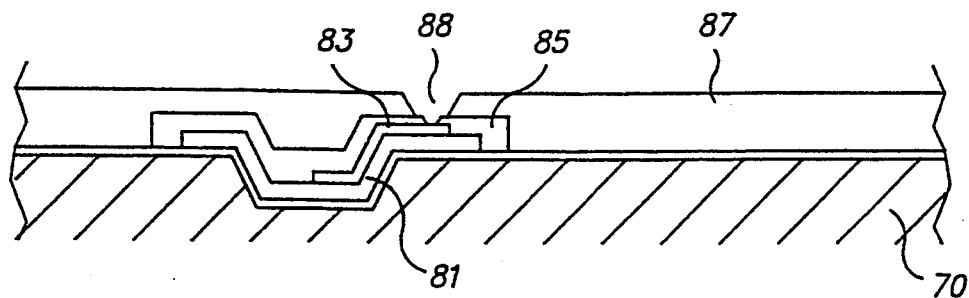
Figure 8F:
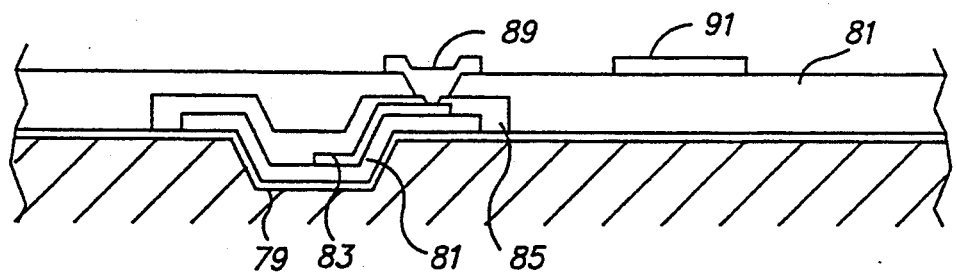
Figure 8G:
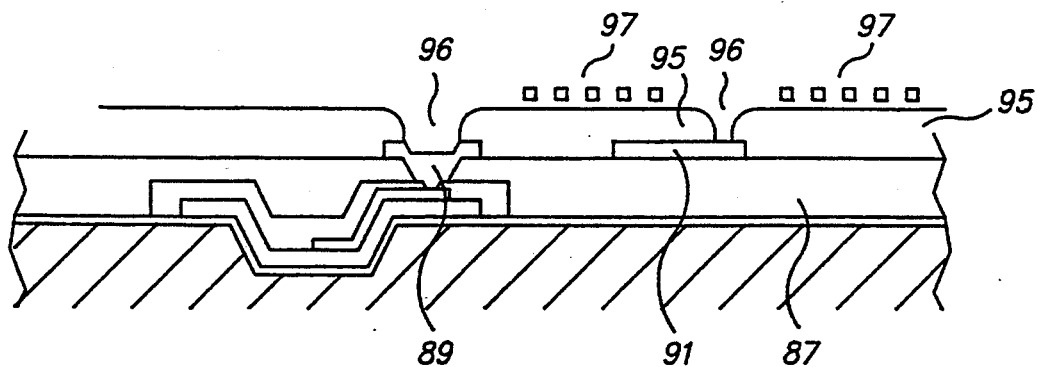
Figure 8H:
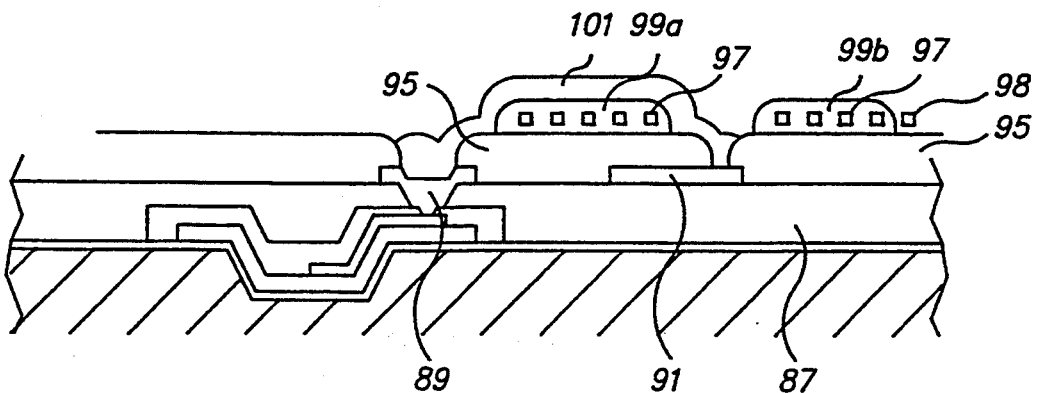
Figure 8I:
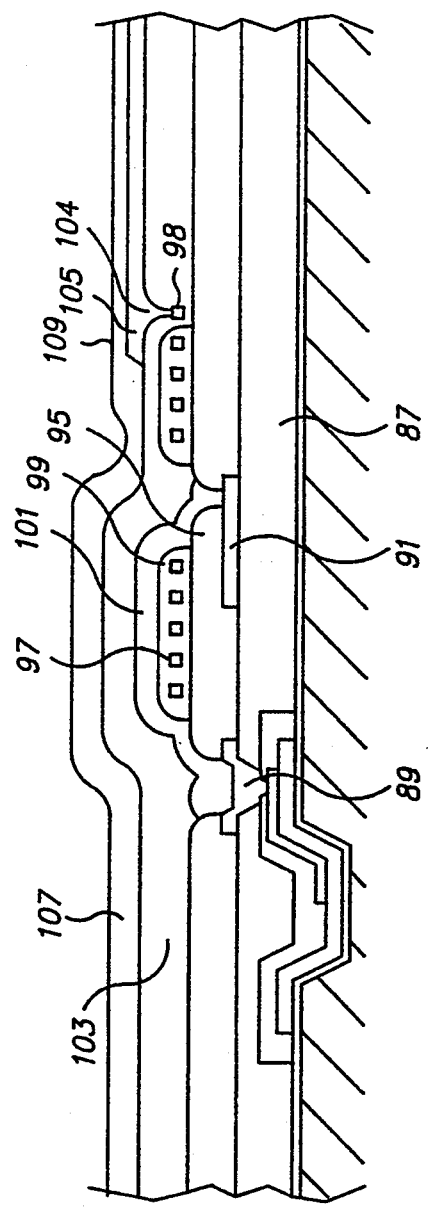
Figure 9:
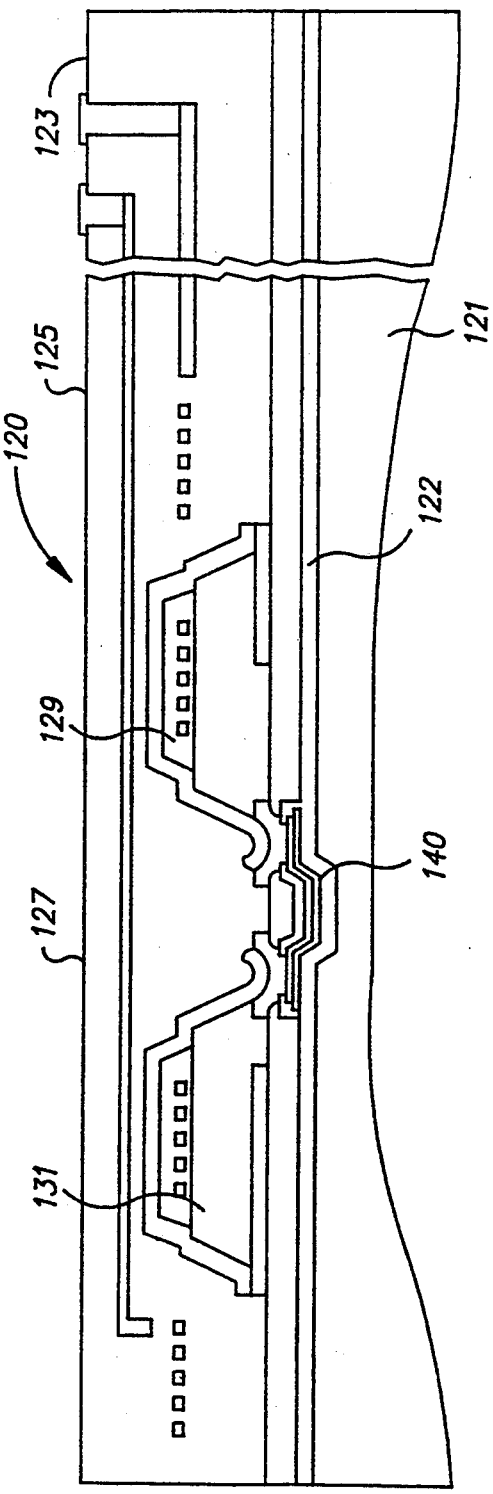
FIG. 9 is a cross-sectional view illustrating a second preferred embodiment of an integrated REED transducer/suspension assembly in accordance with the present invention.
Figure 10:
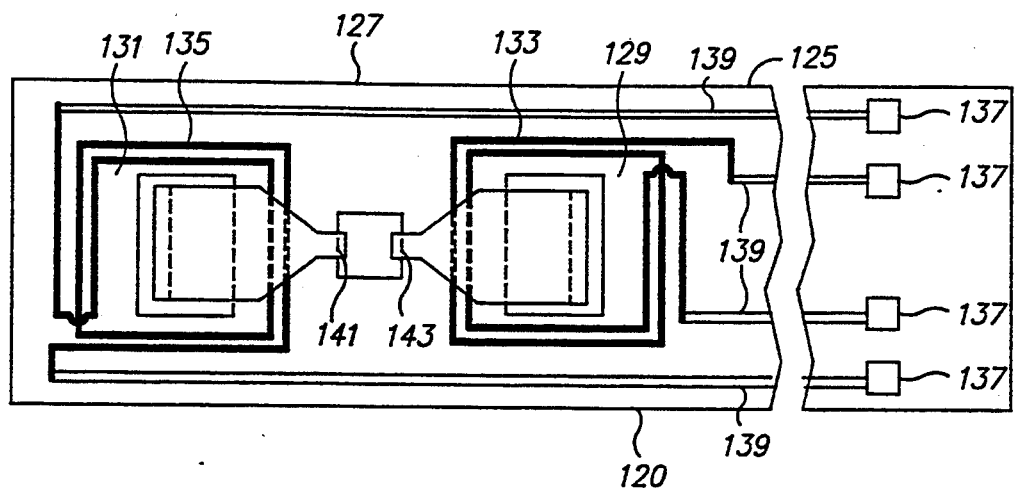
FIG. 10 is a top plan view of the REED assembly shown in FIG. 9.
Figure 8E:
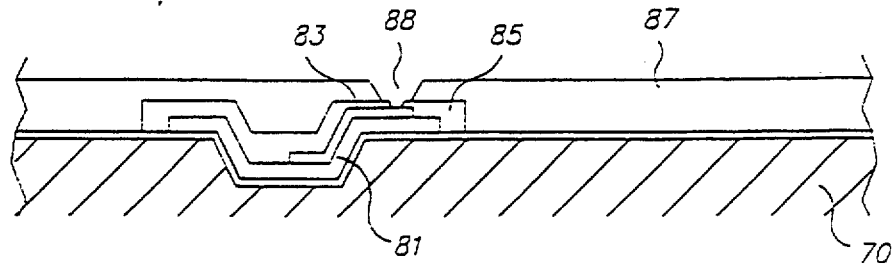
Figure 8F:
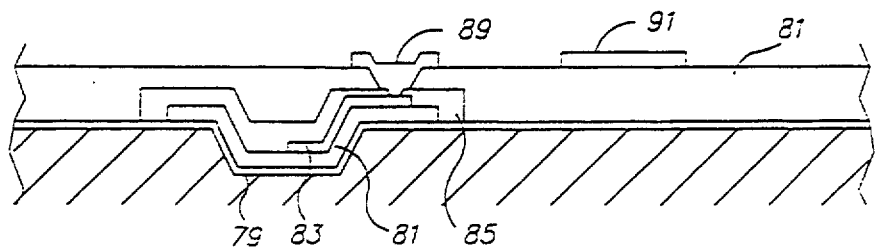
Figure 8G:
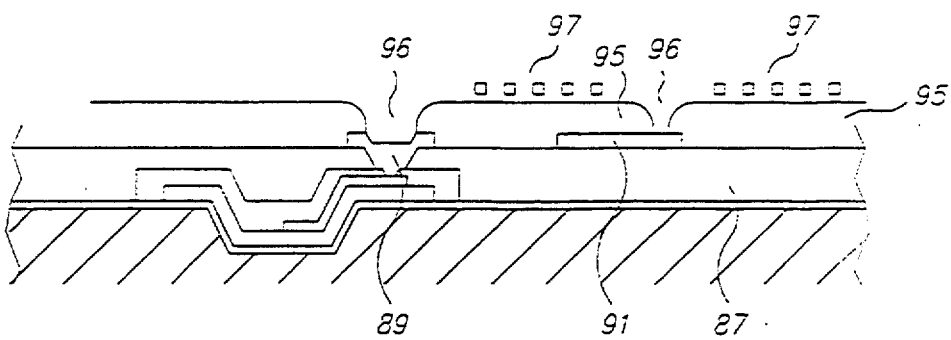
Figure 8H:
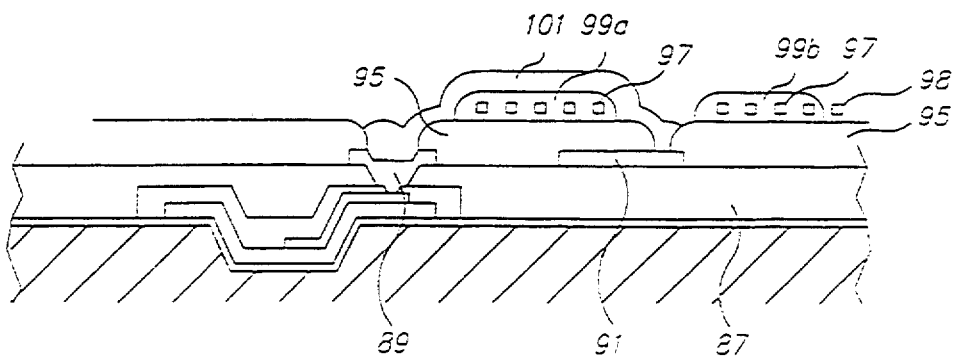
Figure 13:
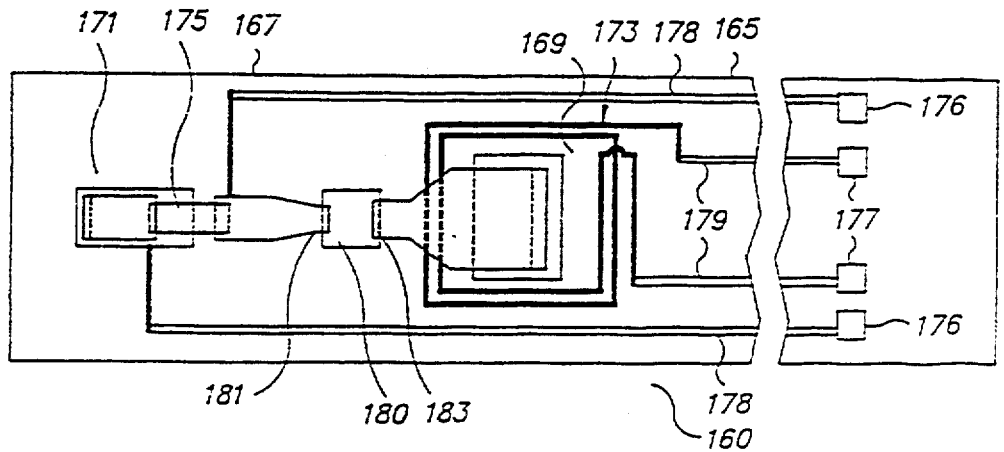
Figure 14A:
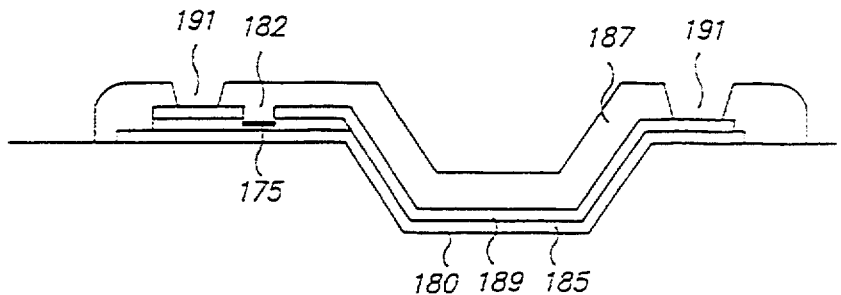
Figure 14B:
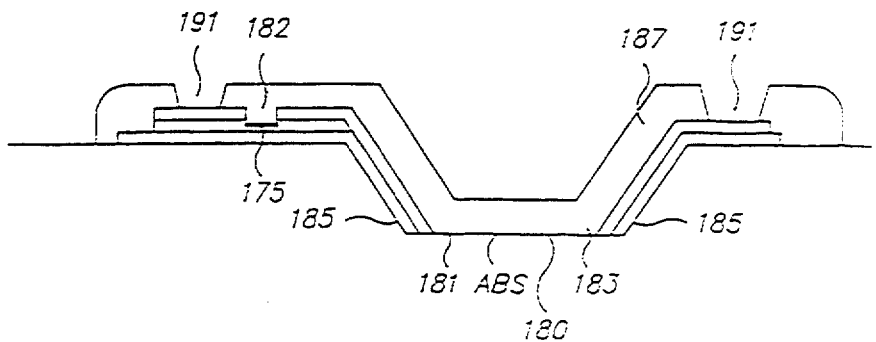

Next, as illustrated in FIG. 8e, a first layer 87 of dielectric material, such as $Al_2O_3$, is deposited over the entire structure forming the first of several layers of material comprising the REED assembly body and suspension section. The first dielectric layer 87 forms a surface for the deposition of the lower magnetic pole piece 91 and is patterned and etched to open via 88 exposing the upper surface of the vertical pole tip 83. As seen in FIG. 8f, a layer of photoresist is formed over the first dielectric layer 87 and patterned. The lower magnetic pole piece 91 and the vertical pole tip connection pad or stud 89 are formed by plating, for example, as is known in the art.

Next, as shown in FIGS. 8g and 8h, photoresist is deposited over the first dielectric layer 87 and patterned and hard baked to provide a first insulation layer 95 for formation of the head coil. The first insulation layer 95 provides a surface for the formation of the electrical coil 97 and electrically insulates the coil from the magnetic pole piece 91 and pole tip 83 structure. The coil conductors 97 are then plated or otherwise deposited on the surface provided by the first insulation layer 95. A layer of photoresist is then deposited over the coils 97 and the insulation layer 95, patterned and hard baked to provide a second insulation layer. The end coil conductor 98 is not covered by the second insulation layer 99b, but is left exposed for forming a connection to a leadout conductor and terminal. A layer of NiFe, or other suitable magnetic material, is then plated or otherwise deposited as is known in the art over the front portion of the second insulation layer 99a to form the upper magnetic pole piece 101. The upper magnetic pole piece 101 is connected to the vertical pole tip 83 stud 89 and lower magnetic pole piece 91 through vias 96.

The final series of process steps, as seen in FIG. 8i, comprise a second layer 103 of dielectric material deposited over the upper magnetic pole piece 101 and the rear portion of the second dielectric layer 99b covering and encapsulating the completed read/write head, and leaving a via 104 open to the end coil conductor 98. This second dielectric layer is about one-half the remaining desired thickness of the suspension section 31. A leadout conductor 105 is then deposited and patterned electrically connecting the coil 97 at conductor 98 to a conductor terminal 55 (as shown in FIG. 3) formed at a remote end of the conductor 105 through via 104. A final dielectric layer 107 is then deposited over the second dielectric layer 103 encapsulating the leadout conductor 105 and building up the assembly body to the desired thickness.

To separate the completed REED assemblies 73, the final dielectric layer 107 is coated with a photoresist layer which is patterned to define the external dimensions of the assembly body 39 (as shown in FIG. 2). The dielectric layer 107 is then wet etched in a basis solution to form and separate the individual REED transducer/suspension assemblies from each other on the wafer 70 surface. To separate the completed transducer/suspension assemblies from the substrate 70, the release layer 79 between the substrate 70 and the first dielectric layer 87 is dissolved as is known in the art.

With continuing reference to FIGS. 7 and 8a–8i, the wafer substrate 70 can be of any suitable material known to those in the art, such as alumina-titanium-carbide (AlTiC) or silicon, for example. The use of single-crystal Si is preferred in that it provides precise control of the cavity sidewall 77 angle. For example, a <100> oriented Si wafer anisotropically etched in a basic solution, KOH, for example, provides a sidewall 77 angle along the <110> plane of 54.7 degrees with respect to the horizontal plane.

The release layer 79 formed on the substrate 70 serves several purposes. The release layer 79 is a sacrificial layer which is eventually dissolved to free the finished transducer/suspension assemblies 73 from the substrate 70. The release layer 79 can, for instance, be an electrically conductive material and thereby serve as a seed or plating base layer for the subsequent layers deposited utilizing plating techniques, such as the pole pieces of the transducer. Likely candidates for the release layer 79 are NiFe or Cu which could be deposited through a sputtering or plating process. The release layer 79 may also serve as a barrier layer, or alternatively, a separate barrier layer may be formed over the release layer 79.

The barrier layer (not shown) similarly serves several functions in the production process. The barrier layer is used to isolate the subsequently deposited layers from the release layer 79. The barrier layer serves as an etch stop to terminate the wet etch process utilized to separated the individual REED assemblies 73 from each other in the wafer rows 71, as described above. The barrier layer also serves as an etch stop to protect the vertical pole tip from any etchant which may be later used to dissolve the release layer 79. The barrier layer may also be used as a wear layer to protect the vertical pole tip during operation in close proximity to a rotating magnetic media. If the barrier layer is not to be used as a wear layer, it is desirable to remove it after the release layer 79 is dissolved.

A thin film deposition process, such as sputter deposition, is utilized for fabrication of the vertical pole tip 81. While FIG. 8c illustrates the vertical pole tip 81 slanted at the angle formed by the cavity 75 slanted sidewalls 77, the slanted vertical pole tip 81 is not restricted to the angle shown, The slope of the slanted vertical pole tip can be any acute angle of 45 to 90 degrees with respect to the ABS as shown in FIG. 5. Since the vertical pole tip 81 is the first transducer element to be formed in the fabrication process, relatively high temperature annealing processes may be employed to optimize the magnetic characteristics of the pole tip 81 without danger of adverse effects on other transducer elements to be fabricated in process steps subsequent to the heat treatment processes. For example, forming the first and second insulation layers 95 and 103 after the pole tip 83 heat treatment processes allows a polyimide material to be used, such as hard-baked photoresist which has a maximum exposure temperature of approximately 250 degrees C., rather than an amorphous dielectric material, such as alumina, for example. It should be noted that, with the exception of the wear-in process to expose the vertical pole tip, the entire REED assembly fabrication process is completed at the wafer level with no mechanical processing steps. For example, there are no lapping steps required. The final surface 109 or the final dielectric layer 107 (as shown in FIG. 8i) of the REED assembly is not lapped, but rather follows the contours of the transducer components and the leadout conductors which the layer 107 covers. Since the portion of the surface area which deviates from being flat comprises only a small percentage of the total area of surface 109, the performance of the REED assembly suspension is not adversely affected in addition to reduction of the number of process steps and process complexity, the elimination of any lapping or other mechanical processing steps minimizes stress induced in the REED assembly during fabrication.

Referring now to FIGS. 9, 10, 11a and 11b, a second preferred embodiment of an integrated REED transducer/suspension assembly 120 formed in accordance with the present invention shown. The Reed assembly 120 formed on a substrate 121 over separation layer 122 comprises an elongated rectangular-shaped, resilient body 123 forming a suspension section 125 and a transducer section 127. In this embodiment, the transducer comprises separate read and write heads. A first vertical probe-type write head 129 and a second vertical probe-type read head 131 are formed adjacent one another having their vertical pole tips 143 and 141, respectively, extending parallel to the slanted sidewalls of the wear pad 140 in opposed, facing relationship. The two heads are fabricated in a series of process steps similar to that described above with respect to FIGS. 8a–8i. Inductively coupled to the magnetic yoke for each head 129, 131 is a separate horizontal coil 133, 135, respectively, optimized for the purpose of the respective heads. The coils 133, 135 are contracted to pairs of connection terminals 137 via lead conductors 139. The lead conductors 139 are plated during the REED assembly fabrication process and run the length of the suspension section 125. Similarly, the materials used and the dimensions of the read magnetic circuit and the write magnetic circuit are chosen to optimize the magnetic characteristics for the read or write function. For example, the width and cross-sectional area of the read head vertical pole tip 141 are substantially smaller than that of the write head vertical pole tip 143.

Figure 11A:
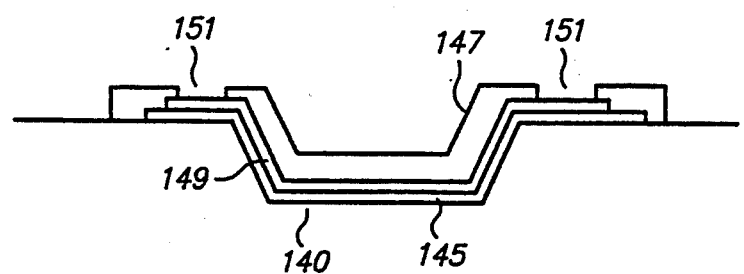
FIGS. 11a and 11b are cross-sectional views illustrating the probe tip and contact pad after separation and after wear-in, respectively, for the REED assembly shown in FIGS. 9 and 10.
Figure 11B:
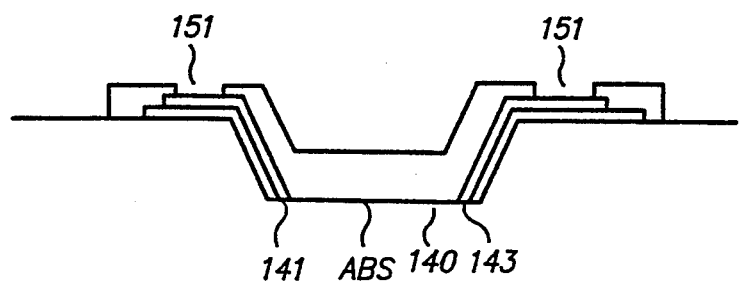
Figure 12:
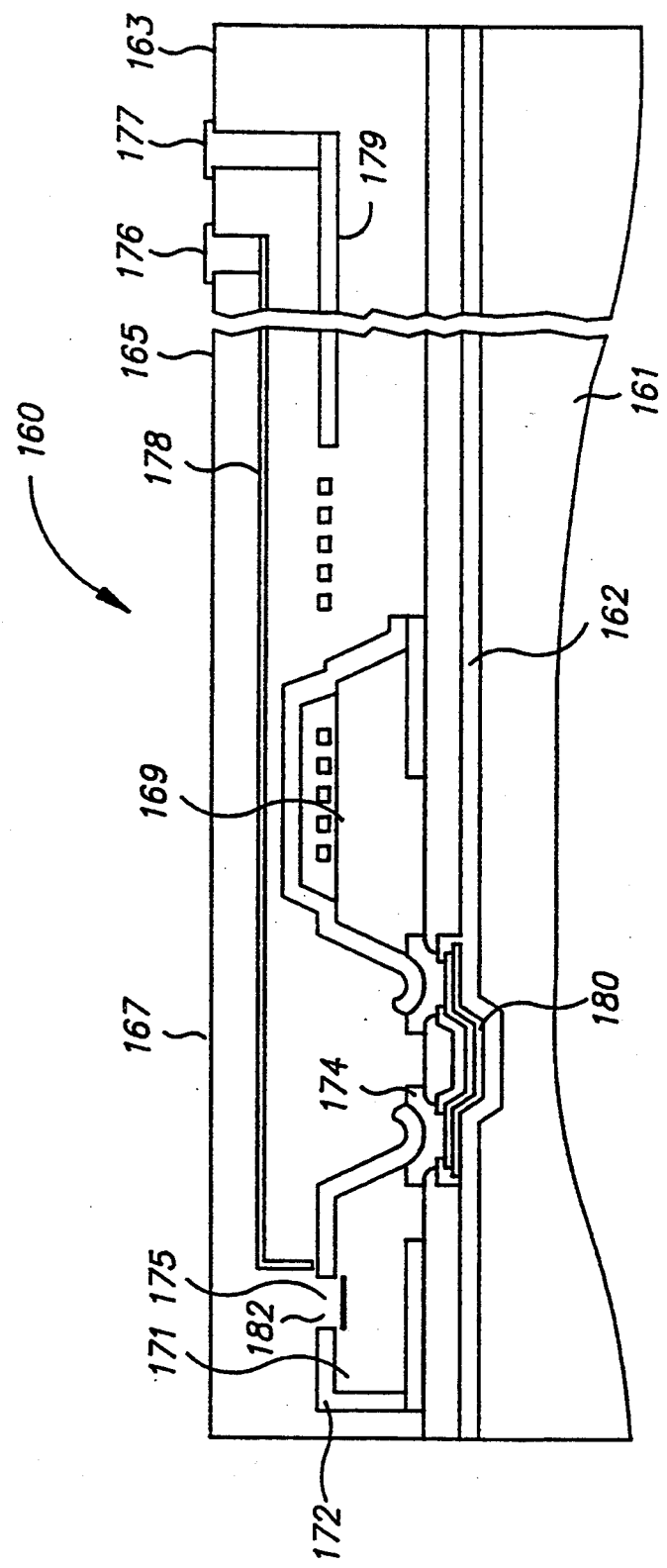
FIG. 12 is a cross-sectional view illustrating a third preferred embodiment of an integrated REED transducer/suspension assembly in accordance with the present invention.
Figure 13:
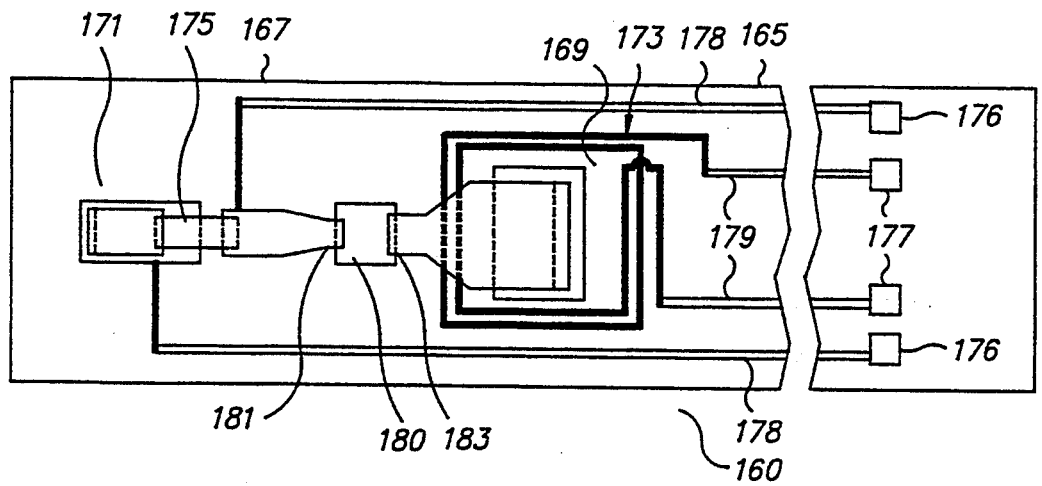
FIG. 13 is a top plan view of the REED assembly shown in FIG. 12.

FIGS. 11a and 11b illustrate the structure of the wear pad 140 for this preferred embodiment. During fabrication, the vertical pole tips 141, 143 for both the read head 131 and the write head 129 are initially formed as a single magnetic layer 149 sandwiched between the first and second wear layers 145 and 147. Dimensional and material differences between the two pole tips 141, 143 are adjusted at the time of the layer deposition using well-known photoresist patterning and etch techniques prior to the deposition of the second wear layer 147. As described above, the second wear layer 147 is etched to open vias 151 to allow subsequent forming of studs to couple the read head magnetic yoke and the write head magnetic yoke to their respective vertical pole tip 141 and 143. Once the fabrication process is complete and the REED assembly 120 is released from the substrate 121 by dissolution of the release layer 122, the wear pad 140 is lightly lapped to remove the bottom horizontal portions of the first wear layer 145 and the magnetic layer 149 to form the ABS and separate and expose the read and write pole tips 141 and 143, respectively.

Referring now to FIGS. 12 13, 14a and 14b, a third preferred embodiment of an integrated REED transducer/suspension assembly 160 formed in accordance with the present invention is shown. The Reed assembly 160 formed on a substrate 161 over separation layer 162 comprises an elongated rectangular-shaped, resilient body 163 forming a suspension section 165 and a transducer section 167. In this embodiment, the transducer comprises separate read and write heads. A vertical probe-type write head 169 and a magnetoresistive (MR) read head 171 incorporating magnetic circuit 172 which serves as a magnetic flux guide for the MR element 175 are formed adjacent one another having vertical pole tips 183 and 181, respectively, extending parallel to the slanted sidewalls of the wear pad 180 in opposed, facing relationship. The two heads are fabricated in a series of process steps similar to that described above with respect to FIGS. 8a–8i. Inductively coupled to the magnetic yoke for the write head 169 is a horizontal coil 173 optimized for a write only function. The coil 173 is connected to a pair of connection terminals 177 via lead conductors 179. The read head 171 includes a magnetic yoke structure 172 magnetically coupled to the read vertical pole tip 181 by stud 174 through via 191. The read yoke structure 172 conducts magnetic flux to an MR sensor element located remotely from the ABS. The MR sensor element 175 is preferably position immediately adjacent a gap 182 formed in the read yoke structure 172 and magnetically connects the end ports of the yoke forming the gap 182. The MR element 172 is typically a thin film of NiFe or other suitable magnetic magnetoresistive material. While shown spaced apart slightly from the read yoke 172, the MR element 172 can alternatively be in contact with the end portions of the read yoke forming the gap 182. The MR element 175 is preferably formed on a planarized alumina layer. While the MR sensor element 175 is shown as a single layer, it should be noted that the MR sensor 175 will typical comprise a multilayered structure including various layers for biasing and stabilizing the MR sensor. The MR sensor element 175 is connected to a pair of lead terminals 176 by lead conductors 178. The lead conductors 178, 179 are plated during the REED assembly fabrication process and run the length of the suspension section 165. The materials used and the dimensions of the read magnetic circuit and the write magnetic circuit are chosen to optimize the magnetic characteristics for the read or write function. For example, the width and cross-sectional area of the read head vertical pole tip 181 are substantially smaller than that of the write head vertical pole tip 183. The remote location of the MR sensor 175 provides important design freedom so that performance can be optimized. For example, with a remotely located MR sensor, track width is a function of the read pole tip dimensions and is independent of the MR sensor length.

Figure 14A:
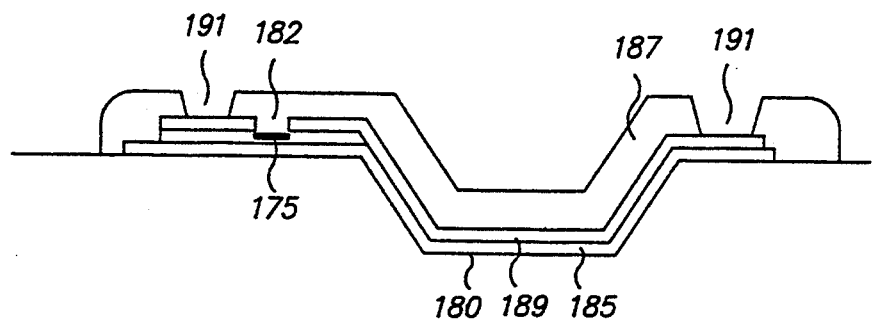
FIGS. 14a and 14b are cross-sectional views illustrating the probe tip and contact pad after separation and after wear-in, respectively, for another embodiment of the REED assembly shown in FIGS. 12 and 13.
Figure 14B:
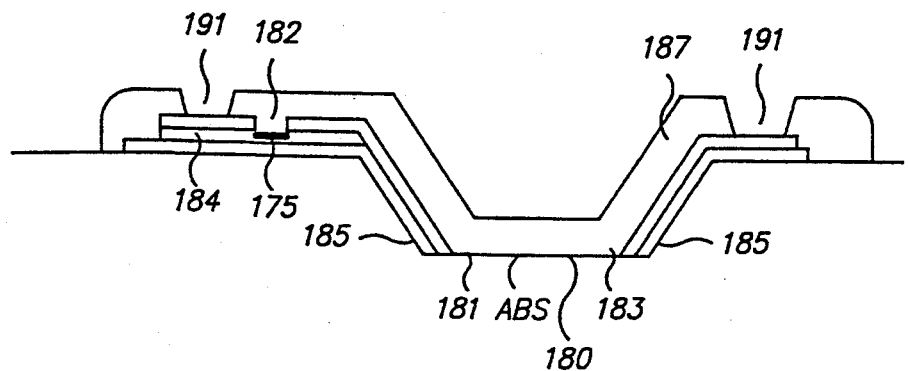
Figure 2:
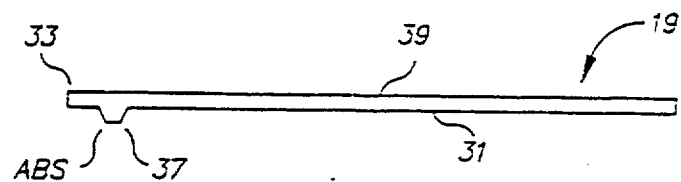
Figure 3:
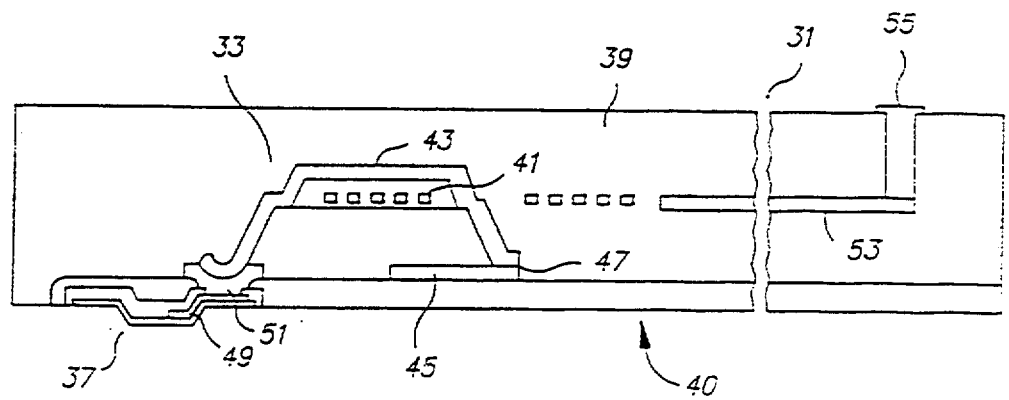
Figure 4:
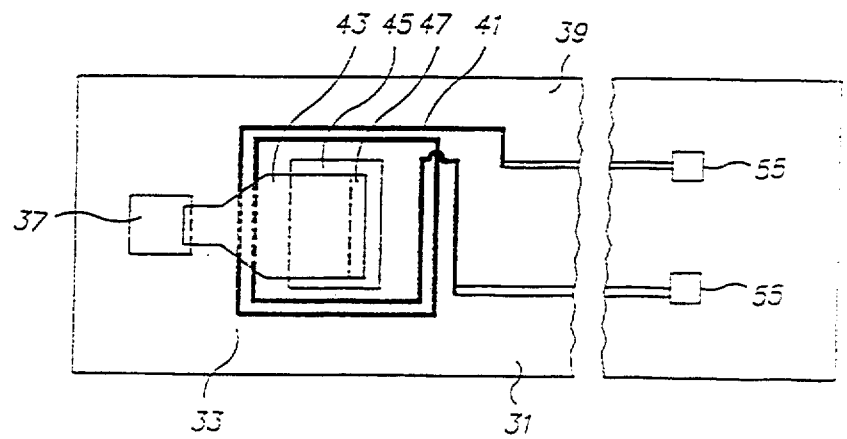

FIGS. 14a and 14b illustrate the structure of the wear pad 180 for this preferred embodiment. During fabrication, the vertical pole tips 181, 183 for both the read head 171 and the write head 169 are initially formed as a single magnetic layer 189 sandwiched between the first and second wear layers 185 and 187. As shown in FIGS. 14a and 14b, the MR sensor element 175 can alternatively be located adjacent a gap 182 formed in the read pole tip 181 structure. Similarly, as in the configuration shown in FIGS. 12 and 13, the MR sensor element is located remotely from the ABS and utilizes the read pole tip 181 and read yoke structure 172 to conduct the magnetic flux. Dimensional and material differences between the two pole tips 181, 183 are adjusted at the time of the layer deposition using well-known photoresist patterning and etch techniques prior to the deposition of the second wear layer 187. As described above, the second wear layer 187 is etched to open vias 191 to allow subsequent forming of studs to couple the read head magnetic yoke and the write head magnetic yoke to their respective vertical pole tip 181 and 183. Once the fabrication process is complete and the REED assembly 160 is released from the substrate 161 by dissolution of the release layer 162, the wear pad 180 is lightly lapped to remove the bottom horizontal portions of the first wear layer 185 and the magnetic layer 189 to form the ABS and separate and expose the read and write pole tips 181 and 183, respectively.

While the invention has been particularly shown and described with reference to preferred embodiments thereof, it will be understood by those skilled in the art that various changes in form and detail may be made therein without departing from the spirit and scope of the invention. Although the suspension portions of the present invention are preferably composed of sputter-deposited alumina, it is recognized that other methods of deposition may be employed and that other materials may be utilized, including other suitable oxides, nitrides, carbonides, glasses, amorphous carbon, diamond-like carbon or laminated combinations of suitable conducting and insulating materials. The suspension section according to the preferred embodiments could be a dual layer of a polyimide material and a metal layer deposited thereon to provide sufficient resiliency and stiffness as required by a suspension assembly. It is also well understood that many electrically conductive materials are available to form the conductive circuitry and the transducer leads. Copper or gold is the preferred conductive material but many others are available as is well known in the art.

We claim:

1. An integral, unitary magnetic transducer and suspension assembly comprising:
   an elongated resilient member formed of a dielectric material and having a first end and a second end, said elongated member shaped to have a suspension portion and a transducer portion, said transducer portion disposed at the first end of said elongated member and including a wear pad protruding from an exterior portion thereof, a lower surface of said wear pad defining an air bearing surface;
   magnetic transducer means embedded in said elongated member at said transducer portion, said magnetic transducer means comprising:
     a first vertically-oriented magnetic pole tip, said first magnetic pole tip extending to and exposed at said air bearing surface, said first magnetic pole tip forming a portion of a magnetic write sensor only for magnetically recording information in a magnetic storage media; and
     a second vertically-oriented magnetic pole tip, said second magnetic pole tip extending to and exposed at said air bearing surface adjacent said first magnetic pole tip, said second magnetic pole tip forming a portion of a magnetic read sensor only for reading information magnetically stored in said magnetic storage media; and
   at least one electrical conductor associated with each of said magnetic write and magnetic read sensors, said electrical conductor embedded in said elongated member and having access on an exterior surface of said elongated member for providing electrical connection to said magnetic write and magnetic read sensors.

2. An integral, unitary magnetic transducer and suspension assembly as in claim 1 wherein said wear pad is formed of diamond-like carbon.

3. An integral, unitary transducer and suspension assembly as in claim 1 wherein:
   said magnetic write sensor includes a first lower magnetic pole piece formed substantially parallel to said air bearing surface, and a first upper magnetic pole piece magnetically coupling said first lower magnetic pole piece to an upper portion of said first magnetic pole tip, said first lower and upper magnetic pole pieces magnetically connected at a first backgap region; and
   said magnetic read sensor includes a second lower magnetic pole piece formed substantially parallel to said air bearing surface, and a second upper magnetic pole piece magnetically coupling said second lower magnetic pole piece to an upper portion of said second magnetic pole tip, said second lower and upper magnetic pole pieces magnetically connected at a second backgap region.

4. A magnetic disk drive system including the unitary transducer and suspension assembly as claimed in claim 1 further including:
   a housing;
   at least one magnetic storage media disk mounted in said housing and having means for storing information in data tracks defined thereon;
   means for moving said magnetic media disk; and
   means mounted in said housing for supporting said unitary magnetic transducer and suspension assembly in a transducing relationship with respect to the magnetic media in response to movement of said magnetic media disk.

5. An integral, unitary transducer and suspension assembly as in claim 1 further including at least one electrical contact pad associated with each of said electrical conductors formed in a surface of said elongated member and electrically communicating with said electrical conductor, said electrical contact pad disposed at the second end of said elongated member.

6. An integral, unitary transducer and suspension assembly as in claim 1 wherein said write sensor is adapted for effecting vertical magnetic recording of information in said magnetic media, and said read sensor is adapted for reading vertically recorded information from said magnetic media.

7. An integral, unitary transducer and suspension assembly as in claim 1 wherein said read sensor comprises an inductive read sensor.

8. An integral, unitary transducer and suspension assembly as in claim 1 wherein said read senor comprises a magnetoresistive read sensor.

* * * * *

UNITED STATES PATENT AND TRADEMARK OFFICE
CERTIFICATE OF CORRECTION

PATENT NO. : 5,408,373
DATED : Apr. 18, 1995
INVENTOR(S) : Bajorek et al.

It is certified that error appears in the above-indentified patent and that said Letters Patent is hereby corrected as shown below:

Column 9, line 7, delete whole line, insert-- 70, the width of the row 71 being equal to the desired--.

Signed and Sealed this

Nineteenth Day of September, 1995

Attest:

BRUCE LEHMAN

Attesting Officer  Commissioner of Patents and Trademarks

UNITED STATES PATENT AND TRADEMARK OFFICE
CERTIFICATE OF CORRECTION

PATENT NO. : 5,408,373
DATED : April 18, 1995
INVENTOR(S) : C. H. Bajorek et al.

It is certified that error appears in the above-indentified patent and that said Letters Patent is hereby corrected as shown below:

Delete Fig. 4 and substitute new Fig. 4.

Delete Fig. 8F, first occurrence, and substitute new Fig. 8E.

Delete Fig. 14B and substitute new Fig. 14B.

Signed and Sealed this

First Day of October, 1996

*Attest:*

BRUCE LEHMAN

*Attesting Officer*     *Commissioner of Patents and Trademarks*